United States Patent
Raveendran et al.

(10) Patent No.: US 10,048,921 B2
(45) Date of Patent: Aug. 14, 2018

(54) CONTROLLING A MULTIMEDIA DEVICE IN REMOTE DISPLAY MODE

(75) Inventors: Vijayalakshmi R. Raveendran, San Diego, CA (US); Yu A. Wang, San Diego, CA (US); Jae-Hee Choi, San Diego, CA (US); Cong T. Nguyen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/038,297

(22) Filed: Mar. 1, 2011

(65) Prior Publication Data

US 2011/0219420 A1 Sep. 8, 2011

Related U.S. Application Data

(60) Provisional application No. 61/309,667, filed on Mar. 2, 2010.

(51) Int. Cl.
| | |
|---|---|
| H04N 7/173 | (2011.01) |
| G06F 3/14 | (2006.01) |
| H04N 21/41 | (2011.01) |
| H04N 21/435 | (2011.01) |

(52) U.S. Cl.
CPC ....... *G06F 3/1454* (2013.01); *H04N 21/4122* (2013.01); *H04N 21/4355* (2013.01); *G09G 2370/16* (2013.01)

(58) Field of Classification Search
USPC ............................ 725/80, 133; 715/716, 719
See application file for complete search history.

(56) References Cited

U.S. PATENT DOCUMENTS

| | | | | |
|---|---|---|---|---|
| 7,627,341 | B2* | 12/2009 | Wu | 455/556.1 |
| 7,725,912 | B2* | 5/2010 | Margulis | H04L 12/2812 725/80 |
| 7,796,190 | B2 | 9/2010 | Basso et al. | |
| 8,261,307 | B1* | 9/2012 | Islam | H04N 21/41407 455/556.1 |
| 8,582,954 | B2* | 11/2013 | Watson | H04N 5/76 369/53.15 |
| 8,620,988 | B2* | 12/2013 | Sohm | G06Q 10/10 370/241 |
| 8,732,772 | B2* | 5/2014 | Kim | 725/82 |
| 2002/0103821 | A1 | 8/2002 | Nikolovska et al. | |
| 2003/0017846 | A1* | 1/2003 | Estevez et al. | 455/556 |

(Continued)

FOREIGN PATENT DOCUMENTS

| | | |
|---|---|---|
| CN | 101582053 A | 11/2009 |
| JP | 2002304283 A | 10/2002 |

(Continued)

OTHER PUBLICATIONS

International Search Report and Written Opinion—PCT/US2011/026915—ISA/EPO—dated May 6, 2011.

*Primary Examiner* — Mushifikh Alam
(74) *Attorney, Agent, or Firm* — Seyfarth Shaw LLP

(57) ABSTRACT

A multimedia device engaged in wireless transmission of content to a remote display may format graphical user interface content for the remote display. The device may also communicate with a human interface device such as a remote control. The remote control may send control information to the multimedia device to control the remote display.

16 Claims, 3 Drawing Sheets

(56) References Cited

U.S. PATENT DOCUMENTS

| | | | |
|---|---|---|---|
| 2003/0128197 A1* | 7/2003 | Turner | G06F 3/1423 345/204 |
| 2003/0192051 A1* | 10/2003 | Yuen | 725/62 |
| 2003/0208759 A1* | 11/2003 | Gordon | H04N 5/44543 725/46 |
| 2004/0003279 A1* | 1/2004 | Beilinson | G06F 21/604 726/7 |
| 2004/0187154 A1* | 9/2004 | Wasilewski | 725/60 |
| 2004/0235532 A1* | 11/2004 | Matthews et al. | 455/566 |
| 2005/0107126 A1* | 5/2005 | Kim | 455/565 |
| 2006/0168533 A1* | 7/2006 | Yip et al. | 715/753 |
| 2007/0039025 A1* | 2/2007 | Kraft et al. | 725/62 |
| 2007/0080823 A1* | 4/2007 | Fu | G08C 23/04 340/4.3 |
| 2007/0093275 A1* | 4/2007 | Bloebaum et al. | 455/566 |
| 2007/0271525 A1* | 11/2007 | Han | G06F 3/017 715/786 |
| 2008/0081619 A1* | 4/2008 | Nagata et al. | 455/434 |
| 2008/0220761 A1* | 9/2008 | Jang | H04M 1/7253 455/420 |
| 2009/0019492 A1* | 1/2009 | Grasset | G11B 27/034 725/45 |
| 2009/0070840 A1* | 3/2009 | Kamimaki | H04N 7/17318 725/114 |
| 2009/0075697 A1* | 3/2009 | Wilson et al. | 455/557 |
| 2009/0079884 A1* | 3/2009 | Lin | 348/739 |
| 2009/0235170 A1* | 9/2009 | Golden et al. | 715/719 |
| 2009/0243959 A1* | 10/2009 | Pering | G06F 3/1423 345/1.3 |
| 2009/0300131 A1* | 12/2009 | Gantman et al. | 709/208 |
| 2009/0313388 A1 | 12/2009 | Li | |
| 2010/0005178 A1* | 1/2010 | Sindelaru | H04L 47/10 709/228 |
| 2010/0121959 A1* | 5/2010 | Lin et al. | 709/228 |
| 2010/0124254 A1* | 5/2010 | Wu | H04L 5/003 375/131 |
| 2010/0317332 A1* | 12/2010 | Bathiche et al. | 455/418 |
| 2011/0070837 A1* | 3/2011 | Griffin | H04B 5/0062 455/41.3 |
| 2011/0074794 A1* | 3/2011 | Felt | H04N 21/4122 345/520 |
| 2011/0078731 A1* | 3/2011 | Nishimura | 725/39 |
| 2011/0105103 A1* | 5/2011 | Ullrich | G06F 3/017 455/420 |
| 2011/0122855 A1* | 5/2011 | Henry | 370/338 |
| 2011/0167444 A1* | 7/2011 | Sun et al. | 725/31 |
| 2011/0185390 A1* | 7/2011 | Faenger | H04M 1/6075 725/75 |
| 2012/0079080 A1* | 3/2012 | Pishevar | 709/220 |
| 2012/0136917 A1* | 5/2012 | Abramson | G06F 9/543 709/203 |
| 2012/0246480 A1* | 9/2012 | Selander et al. | 713/168 |
| 2013/0283324 A1* | 10/2013 | Bonfrer | 725/81 |
| 2014/0032635 A1* | 1/2014 | Pimmel | H04N 21/4126 709/203 |
| 2018/0011609 A1* | 1/2018 | Demar | G09G 3/20 |

FOREIGN PATENT DOCUMENTS

| | | |
|---|---|---|
| JP | 2005020104 A | 1/2005 |
| JP | 2007124286 A | 5/2007 |
| JP | 2007134896 A | 5/2007 |
| JP | 2008092558 A | 4/2008 |
| JP | 2008258989 A | 10/2008 |
| JP | 2010252215 A | 11/2010 |
| JP | 2011041332 A | 2/2011 |
| WO | 2006047064 A2 | 5/2006 |
| WO | 2009053123 A1 | 4/2009 |
| WO | WO-2009140095 A2 | 11/2009 |

* cited by examiner

| Channel | Program |
|---------|---------|
| 2 | Video 1 |
| 3 | Video 2 |
| 4 | Music 1 |
| 5 | Internet |

FIG. 2

CONTROLLING A MULTIMEDIA DEVICE IN REMOTE DISPLAY MODE

CROSS REFERENCE TO RELATED APPLICATION

This application claims the benefit of U.S. provisional patent application No. 61/309,667 filed Mar. 2, 2010, in the names of RAVEENDRAN, et al., the disclosure of which is expressly incorporated herein by reference in its entirety.

BACKGROUND

Field

The present disclosure generally relates to wireless display. More specifically, the present disclosure relates to displaying multimedia content from a multimedia device in remote display mode at an external display device.

Background

Wireless delivery of content to televisions (TVs) and other monitors is desirable. As one example, it may be desirable, in some instances, to have content delivered from a user device for output on a TV device. For instance, as compared with many TV device output capabilities, many portable user devices, such as mobile telephones, personal data assistants (PDAs), media player devices (e.g., APPLE IPOD devices, other MP3 player devices, etc.), laptop computers, notebook computers, etc., have limited/constrained output capabilities, such as small display size, etc. A user desiring, for instance, to view a video on a portable user device may gain an improved audiovisual experience if the video content were delivered for output on a TV device.

SUMMARY

A method is offered. The method includes receiving an indication that a multimedia device enters a remote display mode. The method also includes in response to the indication, wirelessly transmitting multimedia content to a remote display in a format including a graphical user interface (GUI) configured specific for the remote display.

An apparatus is offered. The apparatus includes means for receiving an indication that a multimedia device enters a remote display mode. The apparatus also includes means for, in response to the indication, wirelessly transmitting multimedia content to a remote display in a format including a graphical user interface (GUI) configured specific for the remote display.

A computer program product is offered. The computer program product includes a computer-readable medium having program code recorded thereon. The program code includes program code to receive an indication that a multimedia device enters a remote display mode. The program code also includes program code to, in response to the indication, wirelessly transmit multimedia content to a remote display in a format including a graphical user interface (GUI) configured specific for the remote display.

An apparatus is offered. The apparatus includes a processor(s) and a memory coupled to the processor(s). The processor(s) is configured to receive an indication that a multimedia device enters a remote display mode. The processor(s) is also configured to, in response to the indication, wirelessly transmit multimedia content to a remote display in a format including a graphical user interface (GUI) configured specific for the remote display.

BRIEF DESCRIPTION OF THE DRAWINGS

For a more complete understanding of the present disclosure, reference is now made to the following description taken in conjunction with the accompanying drawings.

FIG. 2 is an illustration of a graphical user interface.

DETAILED DESCRIPTION

White space devices generally refer to unlicensed wireless transceivers that communicate over the unused spectrum in the television band. These devices generally operate in a cognitive manner in which the devices scan first to detect TV band signals (e.g., Advanced Television Systems Committee (ATSC), National Television Systems Committee (NTSC), and certain wireless microphone protocols) from licensed primary users and then select unused channels in order to avoid interference with the licensed signals.

A white space device may be communicatively coupled with or integrated within a user device, and the white space device may thus deliver information (e.g., multimedia content) from the user device to a TV device (e.g., a HDTV device) over TV white space. One method for communicating over television white space is discussed in commonly assigned U.S. patent application Ser. No. 12/984,032 filed Jan. 4, 2011 in the names of RAVEENDRAN et al., the disclosure of which is expressly incorporated herein by reference in its entirety.

In certain instances it may be desirable to wirelessly display content from a content source such as a multimedia host device (e.g., a portable smartphone, tablet, handheld web browsing device, etc.) on a remote display, such as a HDTV, monitor, or other display device. Although in the present disclosure transmission of content over white space is used as an example, the content may be wirelessly transmitted from the content source to the display by a variety of transmission methods (e.g., wireless local area network (WLAN)) and be within the scope of the present disclosure.

In order to make the user experience of remote display of content more pleasing, certain aspects of the present disclosure provide for reformatting of the multimedia content for the remote display, the addition of a Graphical User Interface (GUI) formatted for the remote display, and a reverse link control signal path that couples the multimedia host device with a Human Interface Device (HID), such as a television remote control, a computer mouse, or other device.

While an exemplary system and exemplary implementation of a remote display system are described for illustrative purposes, it will be appreciated by those of ordinary skill in the art that the concepts described are not limited in application to such exemplary system/device but may likewise be employed within various other implementations of systems/devices for delivering information from a user device to a remote display.

Figure 1:
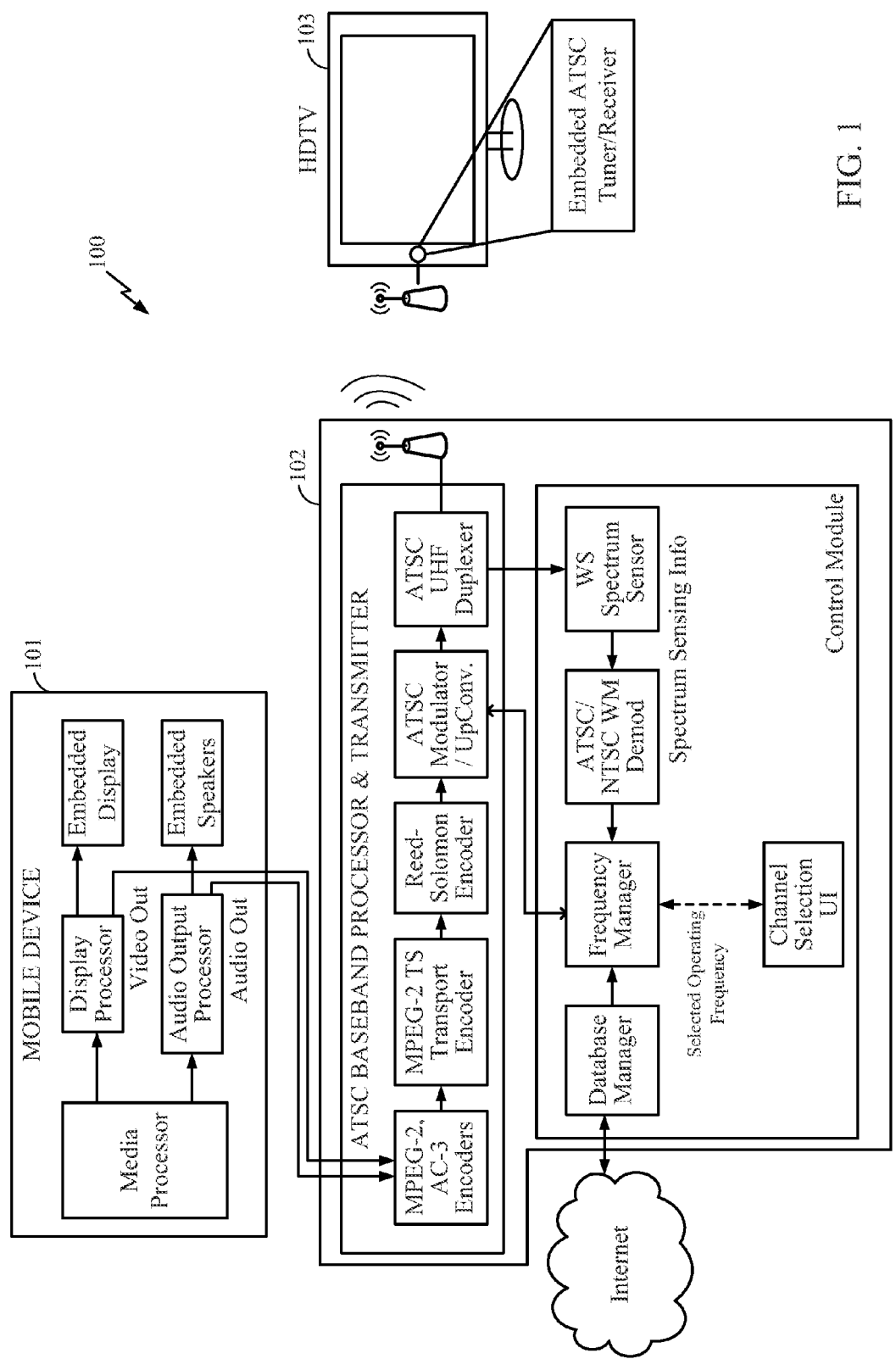
FIG. 1 is an illustration of an exemplary system within which aspects of the present disclosure may be implemented.

FIG. 1 is an illustration of an exemplary system 100 within which aspects of the present disclosure may be implemented. The system 100 includes a user device 101, shown in block-diagram form, which may be referred to as a "host" device. In the illustrated example, the user device 101 is shown as a mobile device, but in other aspects the user device need not be a mobile device. The device 101 may include a media processor, display processor, audio output processor, and may have embedded input/output devices, such as an embedded display and embedded speaker(s). The user device 101 is generally operable to generate content, which may be output via its embedded output devices (e.g., embedded display and speakers). Various types of content are well known in the art for being output on user devices, and any such content may be output on the user device 101 in a given application. For example, a multimedia player application may be executing on user device 101 to output multimedia content (e.g., a television program, movie, etc.). Of course, other content, such as textual content and/or other graphical/image and/or audio content (e.g., emails, web browsing content, video games, word processing content, etc.) may be output in a given application with which a user may be interacting via the user device 101.

The user may input information to the user device 101 (e.g., for interacting with an application executing thereon) via one or more human interface input device(s) (not shown in FIG. 1), such as a pointer device (e.g., mouse), joystick, keyboard, touch-screen interface, microphone, etc. In some instance, such user input information may result in some output being generated or modified. For instance, input of a user's mouse movement may result in corresponding movement of a pointer on an output display of the user device. In another example, a user playing a video game may control the game through buttons and/or a touch interface on the user device 101 or through physical manipulation of the user device 101 (e.g., by shaking it, rotating it, etc.). These interactions by the user may alter the location of a pointer, target, carat, or other icon incorporated in the output display.

Also included in exemplary system 100 is a wireless transmitter 102. Although a white space device is used as a sample wireless transmitter, as discussed above, various wireless transmission protocol (such as wireless USB (WUSB), 802.11, Bluetooth, etc.) may be used. The example wireless transmitter 102 of a white space device is shown in a block-diagram form in FIG. 1. A wireless transmitter 102 is communicatively coupled with the host device 101 for receiving information from such host device 101. In one embodiment, the wireless transmitter 102 is communicatively coupled with the host device 101 via a USB connection, but the wireless transmitter 102 and host device 101 may be communicatively coupled in any suitable manner that allows for information from the host device 101 to be captured by the wireless transmitter 102 as discussed further herein. For example, the wireless transmitter may be communicatively coupled with the host device 101 via another type of wired connection or via a wireless communication connection, such as via wireless USB (WUSB), Bluetooth, 802.11, and/or the like. Alternatively, in certain embodiments, the wireless transmitter 102 may be integrated/embedded within the host device 101, and thus may be communicatively coupled via an internal communication bus, for example, for capture of information from the host device 101. Thus, in one aspect the user device 101 and wireless transmitter 102 may be incorporated into the same physical device.

The wireless transmitter 102 captures information from the user device 101. For instance, the captured information includes "payload content" that is to be output via an output device, such as "video out" and "audio out." As discussed further herein, other information may also be captured by the wireless transmitter 102 in certain aspects, such as "human interface device" (HID) data, e.g., user-input commands (e.g., mouse movements, joystick movements, keyboard input, touch input, movement input, and/or other commands received via human interface device(s)). The wireless transmitter 102 is operable to wirelessly transmit, e.g., via white space, information captured from the user device 101, for instance, to allow the content (e.g., multimedia content) captured from the user device 101 to be received and output by a display device 103, shown in FIG. 1 as an HDTV. User input commands may be included in the transmitted data with timing information to provide correspondence with associated audio or video data.

ATSC is only one example of a set of television transmission standards that can be employed by the white space device, and in other embodiments any of a variety of television standards, such as ATSC standards, Digital Video Broadcasting (DVB) standards, Integrated Services Digital Broadcasting (ISDB) standards, Digital Multimedia Broadcast (DMB) standards, and the like may be employed to transmit media content over white space.

Wireless or remote display may be recognized as a specific display mode by the host device 101. A remote display mode may, in some aspects, be similar to primary display mirroring or secondary/tertiary display mode, used by some host devices. In various embodiments, remote display mode may be set as a primary or secondary (or tertiary, or so on) display mode. A user may select the remote display mode (or any other viewing mode) through submitting user input to the host device 101. The user input may come through direct interaction with the host device or through another means, such as the use of a separate HID device, such as a remote control. Once selected, the remote display mode triggers various functions/features to enrich the user experience.

In one aspect, wireless display solutions of the present disclosure extend the contents of the display from a portable device to an external, typically, larger display. In so doing, various embodiments transform a single-user experience to a multi-viewer experience. Various embodiments adapt to preserve user friendliness/Quality of Experience (QoE). For instance, with respect to audio/video (AV) processing, a 1-ft viewing might adapt to a 10-ft (or across the room) viewing/listening experience. Various features are described below which provide one or more adaptations to preserve the user experience.

In one aspect, a GUI adapted for HDTV is added to the displayed content. Such GUI may be added by either the host device 101 or by the wireless transmitter 102 and may be different (or the same as) a GUI that is natively supported by the host device 101. TV users are familiar with TV-type interfaces, and TV-type interfaces work well with existing remote controls. Thus, at least one embodiment adopts a GUI that lists content options in a scrolling list, not unlike those produced by television content distributors (such as satellite TV or cable companies) or by entities such as TVGUIDE™, which is a consumer-recognizable TV interface. An example GUI is shown in FIG. 2, and it is understood that a user may scroll up or down for more options and may select one of the options using an HID, as explained in more detail below.

The host device 101 may be controlled in any of several ways. In one example, an HID associated with the host device 101 (e.g., a mouse or keyboard integral to the host device 101) may be used to control the viewing mode, as well as the actions within the white space GUI.

In another example, there is a reverse channel for closed loop control. Interaction with the white space GUI is accomplished through a traditional audio/video remote control or other HID that is separate from the host device 101. The remote control may be one that is normally used to control (either directly or through other components) the display device/HDTV 103. The user input/output is sent from the remote control or other HID using infrared (IR), Radio Frequency (RF), Bluetooth, or Zigbee control signals. These control signals are communicated back to the host device 101 to close the loop. They may travel directly to the host device, may travel through the wireless transmitter 102, or may travel through a different intermediary before reaching the host device 101. In some embodiments, the intermediary, such as wireless transmitter 102, translates the HID signals into commands that are sent to the host 101 on the reverse link. In other examples, the host device 101 includes functionality to be controlled by a universal TV remote control so that host device 101 can translate the remote control signals into actions.

While TV remote controls and universal remote controls are mentioned above as possible HIDs that can be used, embodiments are not so limited. In fact, various embodiments may use any of a variety of HIDs now known or later developed. For instance, the host device 101 and the wireless transmitter 102 may be adapted so that a wireless mouse can be held by a human user and used like a TV remote control. Whichever HID is used, a human user can navigate through the GUI and select functions and content using the HID. Furthermore, a GUI such as that shown in FIG. 2 is exemplary, but the scope of embodiments is not limited thereto. For instance, in another example, widgets may be used for user interaction, where widgets usually include a two- or three-dimensional visual object that represents a choice or action and can be acted upon by navigation on the screen. Various embodiments may use any of a variety of interfaces now known or later developed.

In another aspect, video and/or audio of the content may be configured/reformatted for display on the remote display 103. When the host device 101 enters remote display mode, the host device 101 (and/or the wireless transmitter) converts the browser or application window from a native format of the host device 101 to a "TV format." The TV format may be configured for viewing conditions, e.g., from 1 ft viewing to 10 ft viewing, or may be configured for the specific display (e.g., 1080p resolution). Various types of formatting may include resolution changes, font changes for text, regeneration of graphics, generation of the GUI, generation of icons, generation of widgets, and/or the like. Any type of formatting now known or later developed may be used by some embodiments.

In another aspect, the host device 101 may employ traditional remote control functionality to control the viewing experience. Using infrared (IR), Radio Frequency (RF), Bluetooth, or Zigbee, a host device may execute user commands such as playback control, cursor control, etc. In certain embodiments the host device 101 may be programmed to copy the wireless control signals of a remote control or similar HID device.

Figure 3:
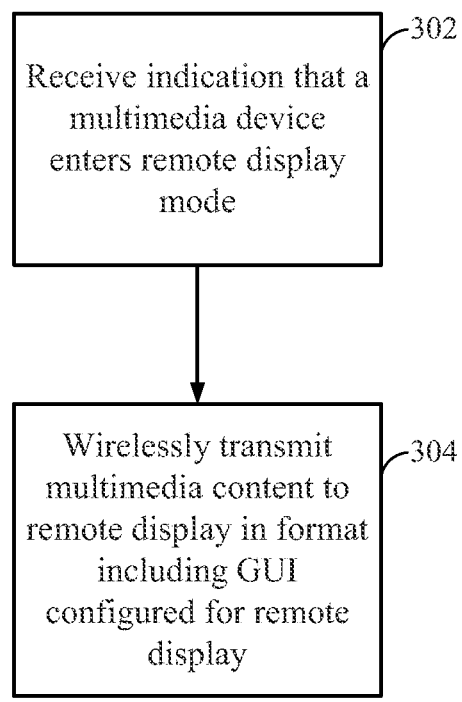
FIG. 3 illustrates wireless transmission of content according to one aspect.

FIG. 3 illustrates wireless transmission of content according to one aspect. As shown in block 302 an indication is received that a multimedia device enters a remote display mode. In block, 304, in response to the indication, multimedia content is wirelessly transmitted to a remote display in a format including a graphical user interface (GUI) configured for the remote display.

In one aspect an apparatus includes means for receiving an indication that a multimedia device enters remote display mode and means for wirelessly transmitting to a remote display including a GUI configured for the remote display. In one aspect the aforementioned means may be a mobile device 101, media processor, display processor, wireless transmitter 102, antennae, remote display 103, and/or the embedded receiver.

The word "exemplary" is used herein to mean "serving as an example, instance, or illustration." Any embodiment described herein as "exemplary" is not necessarily to be construed as preferred or advantageous over other embodiments.

Although the present disclosure and its advantages have been described in detail, it should be understood that various changes, substitutions and alterations can be made herein without departing from the technology of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
   receiving an input, at a mobile multimedia device, to enter a remote display mode for transmitting multimedia content to a remote display device;
   configuring, in response to the input, graphical user interface (GUI) data to be superimposed on the multimedia content transmitted from the mobile multimedia device, the GUI data configured based on capabilities of a display screen of the remote display device, the GUI data providing multimedia content options for a user to change a type of multimedia content transmitted from the mobile multimedia device;
   wirelessly transmitting, from the mobile multimedia device to the remote device via white space, the GUI data and the multimedia content;
   receiving, at the mobile multimedia device, control signaling from a human interface device (HID) associated with the mobile multimedia device to change the type of multimedia content based on the HID's interaction with the GUI data displayed on the remote display device;
   translating the control signaling into actions related to changing the type of multimedia content; and
   wirelessly transmitting the changed type of multimedia content and the GUI data directly from the mobile multimedia device to the remote display device over the white space.

2. The method of claim 1 in which the receiving the input comprises receiving user input requesting that the mobile multimedia device enter the remote display mode.

3. The method of claim 1 in which the control signaling is sent via one of Bluetooth, infrared, radio frequency, and Zigbee.

4. The method of claim 1 in which the GUI data configured for the display screen of the remote display device comprises at least one of a resolution, font, graphic regeneration rate, and browser configured for the display screen of the remote display device.

5. An apparatus comprising:
means for receiving an input, at a mobile multimedia device, to enter a remote display mode for transmitting multimedia content to a remote display device;
means for, in response to the input, configuring graphical user interface (GUI) data to be superimposed on the multimedia content transmitted from the mobile multimedia device, the GUI data configured based on capabilities of a display screen of the remote display device, the GUI data providing multimedia content options for a user to change a type of multimedia content transmitted from the mobile multimedia device;
means for wirelessly transmitting, from the mobile multimedia device to the remote device via white space, the GUI data and the multimedia content;
means for receiving, at the mobile multimedia device, control signaling from a human interface device (HID) associated with the mobile multimedia device to change the type of multimedia content based on the HID's interaction with the GUI data displayed on the remote display device;
means for translating the control signaling into actions related to changing the type of multimedia content; and
means for wirelessly transmitting the changed type of multimedia content and the GUI data directly from the mobile multimedia device to the remote display device over the white space.

6. The apparatus of claim 5 in which the control signaling is sent via one of Bluetooth, infrared, radio frequency, and Zigbee.

7. A non-transitory computer-readable medium having program code recorded thereon, the program code comprising:
program code to receive an input, at a mobile multimedia device, to enter a remote display mode for transmitting multimedia content to a remote display device;
program code to configure graphical user interface (GUI) data to be superimposed on the multimedia content transmitted from the mobile multimedia device, the GUI data configured based on capabilities of a display screen of the remote display device, the GUI data providing multimedia content options for a user to change a type of multimedia content transmitted from the mobile multimedia device;
program code to wirelessly transmit, from the mobile multimedia device to the remote device via white space, the GUI data and the multimedia content;
program code to receive, at the mobile multimedia device, control signaling from a human interface device (HID) associated with the mobile multimedia device to change the type of multimedia content based on the HID's interaction with the GUI data displayed on the remote display device;
program code to translate the control signaling into actions related to changing the type of multimedia content; and
program code to wirelessly transmit the changed type of multimedia content and the GUI data directly from the mobile multimedia device to the remote display device over the white space.

8. The non-transitory computer-readable medium of claim 7 in which the control signaling is sent via one of Bluetooth, infrared, radio frequency, and Zigbee.

9. A mobile multimedia device comprising:
at least one processor; and
a memory coupled to the at least one processor, the at least one processor being configured:
to receive an input to enter a remote display mode for transmitting multimedia content to a remote display device;
to configure graphical user interface (GUI) data to be superimposed on the multimedia content transmitted from the mobile multimedia device, the GUI data configured based on capabilities of a display screen of the remote display device, the GUI data providing multimedia content options for a user to change a type of multimedia content transmitted from the mobile multimedia device;
to wirelessly transmit, to the remote device via white space, the GUI data and the multimedia content;
to receive control signaling from a human interface device (HID) associated with the mobile multimedia device to change the type of multimedia content based on the HID's interaction with the GUI data displayed on the remote display device;
to translate the control signaling into actions related to changing the type of multimedia content; and
to wirelessly transmit the changed type of multimedia content and the GUI data directly to the remote display device over the white space.

10. The mobile multimedia device of claim 9 in which the input comprises user input requesting that the mobile multimedia device enter the remote display mode.

11. The mobile multimedia device of claim 9 in which the control signaling is sent via one of Bluetooth, infrared, radio frequency, and Zigbee.

12. The mobile multimedia device of claim 9 in which the GUI data configured for the display screen of the remote display device comprises at least one of a resolution, font, graphic regeneration rate, and browser configured for the display screen of the remote display device.

13. The method of claim 1, further comprising:
receiving the control signaling over a reverse link from the HID via the remote display device.

14. The mobile multimedia device of claim 9, in which the at least one processor is configured to receive the control signaling over a reverse link from the HID via the remote display device.

15. The method of claim 1, in which the GUI data comprises a scrollable list of different multimedia content.

16. The mobile multimedia device of claim 9, in which the GUI data comprises a scrollable list of different multimedia content.

* * * * *